United States Patent
Pettitt

(10) Patent No.: US 7,752,084 B2
(45) Date of Patent: *Jul. 6, 2010

(54) METHOD AND SYSTEM FOR DETECTING FRAUD IN A CREDIT CARD TRANSACTION OVER THE INTERNET

(75) Inventor: John Philip Pettitt, Los Altos, CA (US)

(73) Assignee: Cybersource Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/626,143

(22) Filed: Nov. 25, 2009

(65) Prior Publication Data

US 2010/0063917 A1    Mar. 11, 2010

Related U.S. Application Data

(63) Continuation of application No. 12/175,191, filed on Jul. 17, 2008, now abandoned, which is a continuation of application No. 11/168,966, filed on Jun. 27, 2005, now abandoned, which is a continuation of application No. 09/442,106, filed on Nov. 17, 1999, now Pat. No. 7,096,192, which is a continuation of application No. 08/901,687, filed on Jul. 28, 1997, now Pat. No. 6,029,154.

(51) Int. Cl.
G06Q 30/00 (2006.01)

(52) U.S. Cl. ................................ 705/26; 705/1; 705/39; 705/44

(58) Field of Classification Search .................... 705/26, 705/39, 44

See application file for complete search history.

(56) References Cited

U.S. PATENT DOCUMENTS 3,657,702 A    4/1972   Godman et al.

(Continued)

FOREIGN PATENT DOCUMENTS

EP    0468229 A2    1/1991

(Continued)

OTHER PUBLICATIONS

Cerne, Frank; "Taking those first few steps"; Credit Card Management, v9, n8, p. 94-104, Nov. 1986; extracted from Dialog search on Apr. 26, 2010.*

(Continued)

*Primary Examiner*—Yogesh C Garg
(74) *Attorney, Agent, or Firm*—Reed Smith LLP; Carina M. Tan; Craig P. Opperman

(57) ABSTRACT

A computer-implemented method is disclosed, where first information that is related to a current commercial transaction that is being evaluated for fraud is received, either directly or indirectly, from a consumer through an online service or internet. The computer obtains an internet address from which the first information is received from the consumer. In response to obtaining the internet address, the computer accesses at least one database to obtain a second information on a plurality of commercial transactions that have been previously associated with the internet address from which the first information is received from the consumer. An indication is produced on whether the current commercial transaction is fraudulent based on correlating at least one subset of the second information and at least one subset of the first information.

18 Claims, 3 Drawing Sheets

U.S. PATENT DOCUMENTS

| | | |
|---|---|---|
| 3,950,733 A | 4/1976 | Cooper et al. |
| 4,044,243 A | 8/1977 | Cooper et al. |
| 4,254,474 A | 3/1981 | Cooper et al. |
| RE30,579 E | 4/1981 | Goldman et al. |
| RE30,580 E | 4/1981 | Goldman et al. |
| 4,305,095 A | 12/1981 | Dallas |
| 4,326,259 A | 4/1982 | Cooper et al. |
| 4,485,300 A | 11/1984 | Peirce |
| 4,510,382 A | 4/1985 | Walter |
| 4,528,643 A | 7/1985 | Freeny, Jr. |
| 4,578,530 A | 3/1986 | Zeidler |
| 4,594,663 A | 6/1986 | Nagata |
| 4,734,564 A | 3/1988 | Boston |
| 4,734,858 A | 3/1988 | Schlafly |
| 4,755,935 A | 7/1988 | Davis et al. |
| 4,755,940 A | 7/1988 | Brachtl et al. |
| 4,760,604 A | 7/1988 | Cooper et al. |
| 4,792,968 A | 12/1988 | Katz |
| 4,795,890 A | 1/1989 | Goldman |
| 4,799,156 A | 1/1989 | Shavit et al. |
| 4,812,628 A | 3/1989 | Boston et al. |
| 4,827,508 A | 5/1989 | Shear |
| 4,845,739 A | 7/1989 | Katz |
| 4,893,330 A | 1/1990 | Franco |
| 4,897,811 A | 1/1990 | Scofield |
| 4,922,521 A | 5/1990 | Krikke et al. |
| 4,935,870 A | 6/1990 | Burk, Jr. et al. |
| 4,947,028 A | 8/1990 | Gorog |
| 4,949,257 A | 8/1990 | Orbach |
| 4,958,375 A | 9/1990 | Reilly |
| 4,977,595 A | 12/1990 | Ohta et al. |
| 4,982,346 A | 1/1991 | Girouard et al. |
| 4,992,940 A | 2/1991 | Dworkin |
| 5,025,373 A | 6/1991 | Keyser, Jr. et al. |
| 5,060,153 A | 10/1991 | Nakagawa |
| 5,077,607 A | 12/1991 | Johnson et al. |
| 5,175,682 A | 12/1992 | Higashiyama et al. |
| 5,177,342 A | 1/1993 | Adams |
| 5,206,488 A | 4/1993 | Teicher |
| 5,220,501 A | 6/1993 | Lawlor et al. |
| 5,231,570 A | 7/1993 | Lee |
| 5,247,575 A | 9/1993 | Sprague et al. |
| 5,253,341 A | 10/1993 | Rozmanith et al. |
| 5,255,342 A | 10/1993 | Nitta |
| 5,291,550 A | 3/1994 | Levy et al. |
| 5,305,195 A | 4/1994 | Murphy |
| 5,311,594 A | 5/1994 | Penzias |
| 5,321,751 A | 6/1994 | Ray et al. |
| 5,335,265 A | 8/1994 | Cooper et al. |
| 5,336,870 A | 8/1994 | Hughes et al. |
| 5,341,429 A | 8/1994 | Stringer et al. |
| 5,347,632 A | 9/1994 | Filepp et al. |
| 5,351,186 A | 9/1994 | Bullock et al. |
| 5,351,293 A | 9/1994 | Michener et al. |
| 5,351,296 A | 9/1994 | Sullivan |
| 5,377,269 A | 12/1994 | Heptig et al. |
| 5,383,113 A | 1/1995 | Kight et al. |
| 5,386,104 A | 1/1995 | Sime |
| 5,398,300 A | 3/1995 | Levey |
| 5,414,833 A | 5/1995 | Hershey et al. |
| 5,420,405 A | 5/1995 | Chasek |
| 5,471,627 A | 11/1995 | Means et al. |
| 5,475,585 A | 12/1995 | Bush |
| 5,479,574 A | 12/1995 | Glier et al. |
| 5,491,817 A | 2/1996 | Copal et al. |
| 5,500,513 A | 3/1996 | Langhans et al. |
| 5,511,122 A | 4/1996 | Atkinson |
| 5,515,307 A | 5/1996 | Aiello et al. |
| 5,530,438 A | 6/1996 | Bickham et al. |
| 5,542,054 A | 7/1996 | Batten |
| 5,557,518 A | 9/1996 | Rosen |
| 5,590,197 A | 12/1996 | Chen et al. |
| 5,596,642 A | 1/1997 | Davis et al. |
| 5,596,643 A | 1/1997 | Davis et al. |
| 5,604,802 A | 2/1997 | Holloway |
| 5,608,801 A | 3/1997 | Aiello et al. |
| 5,621,797 A | 4/1997 | Rosen |
| 5,623,547 A | 4/1997 | Jones et al. |
| 5,627,972 A | 5/1997 | Shear |
| 5,629,982 A | 5/1997 | Micali |
| 5,642,419 A | 6/1997 | Rosen |
| 5,671,280 A | 9/1997 | Rosen |
| 5,675,713 A | 10/1997 | Batten |
| 5,696,907 A | 12/1997 | Tom |
| 5,696,909 A | 12/1997 | Wallner |
| 5,701,398 A | 12/1997 | Glier et al. |
| 5,703,949 A | 12/1997 | Rosen |
| 5,704,018 A | 12/1997 | Heckerman et al. |
| 5,708,422 A | 1/1998 | Blonder et al. |
| 5,710,887 A | 1/1998 | Chelliah et al. |
| 5,715,314 A | 2/1998 | Payne et al. |
| 5,724,424 A | 3/1998 | Gifford |
| 5,729,594 A | 3/1998 | Klingman |
| 5,732,400 A | 3/1998 | Mandler |
| 5,745,654 A | 4/1998 | Titan |
| 5,757,917 A | 5/1998 | Rose et al. |
| 5,758,327 A | 5/1998 | Gardner et al. |
| 5,768,478 A | 6/1998 | Batten |
| 5,790,645 A | 8/1998 | Fawcett et al. |
| 5,802,256 A | 9/1998 | Heckerman |
| 5,802,497 A | 9/1998 | Manasse |
| 5,805,686 A | 9/1998 | Moller et al. |
| 5,809,144 A | 9/1998 | Sirbu et al. |
| 5,812,668 A | 9/1998 | Weber |
| 5,815,657 A | 9/1998 | Williams et al. |
| 5,819,226 A | 10/1998 | Gopinathan et al. |
| 5,822,737 A | 10/1998 | Ogram |
| 5,826,245 A | 10/1998 | Sandberg-Diment |
| 5,832,465 A | 11/1998 | Tom |
| 5,850,442 A | 12/1998 | Muftic |
| 5,870,473 A | 2/1999 | Boesch et al. |
| 5,875,236 A | 2/1999 | Jankowitz et al. |
| 5,878,139 A | 3/1999 | Rosen |
| 5,878,337 A | 3/1999 | Joao et al. |
| 5,884,289 A | 3/1999 | Anderson et al. |
| 5,897,621 A | 4/1999 | Boesch et al. |
| 5,899,980 A | 5/1999 | Wile et al. |
| 5,905,736 A | 5/1999 | Ronen et al. |
| 5,940,529 A | 8/1999 | Buckley |
| 5,940,809 A | 8/1999 | Musmanno et al. |
| 5,953,710 A | 9/1999 | Fleming |
| 5,970,469 A | 10/1999 | Scroggie et al. |
| 5,988,497 A | 11/1999 | Wallace |
| 6,000,608 A | 12/1999 | Dorf |
| 6,029,154 A | 2/2000 | Pettitt |
| 6,078,904 A | 6/2000 | Rebane |
| 6,094,643 A | 7/2000 | Anderson |
| 6,163,604 A | 12/2000 | Baulier et al. |
| 6,182,070 B1 | 1/2001 | Megiddo et al. |
| 6,189,005 B1 | 2/2001 | Chakrabarti et al. |
| 6,216,153 B1 | 4/2001 | Vortriede |
| 6,225,999 B1 | 5/2001 | Jain et al. |
| 6,278,997 B1 | 8/2001 | Agrawal et al. |
| 6,289,452 B1 | 9/2001 | Arnold et al. |
| 6,295,326 B1 | 9/2001 | Tonissen et al. |
| 6,308,148 B1 | 10/2001 | Bruins et al. |
| 6,321,095 B1 | 11/2001 | Gavette |
| 6,330,546 B1 | 12/2001 | Gopinathan et al. |
| 6,336,108 B1 | 1/2002 | Thiesson et al. |
| 6,339,423 B1 | 1/2002 | Belmonte et al. |
| 6,345,265 B1 | 2/2002 | Thiesson et al. |
| 6,363,488 B1 | 3/2002 | Ginter et al. |
| 6,389,402 B1 | 5/2002 | Ginter et al. |
| 6,405,179 B1 | 6/2002 | Rebane |

| | | | |
|---|---|---|---|
| 6,418,436 | B1 | 7/2002 | Degan et al. |
| 6,430,539 | B1 | 8/2002 | Lazarus et al. |
| 6,453,353 | B1 | 9/2002 | Win et al. |
| 6,490,624 | B1 | 12/2002 | Sampson et al. |
| 6,529,888 | B1 | 3/2003 | Hecherman et al. |
| 6,536,037 | B1 | 3/2003 | Guheen et al. |
| 6,577,336 | B2 | 6/2003 | Safai |
| 6,593,963 | B1 | 7/2003 | Safai |
| 6,609,118 | B1 | 8/2003 | Khedkar et al. |
| 6,611,598 | B1 | 8/2003 | Hayosh |
| 6,629,081 | B1 | 9/2003 | Cornelius et al. |
| 6,642,956 | B1 | 11/2003 | Safai |
| 6,654,054 | B1 | 11/2003 | Embler |
| 6,714,918 | B2 | 3/2004 | Hilmer et al. |
| 6,728,884 | B1 | 4/2004 | Lim |
| 6,732,151 | B1 | 5/2004 | Tobias et al. |
| 6,779,016 | B1 | 8/2004 | Aziz et al. |
| 6,788,647 | B1 | 9/2004 | Mohaban et al. |
| 6,829,635 | B1 | 12/2004 | Townshend |
| 6,873,877 | B1 | 3/2005 | Tobias et al. |
| 6,981,050 | B1 | 12/2005 | Tobias et al. |
| 7,069,234 | B1 | 6/2006 | Cornelius et al. |
| 7,089,428 | B2 | 8/2006 | Farley et al. |
| 7,096,192 | B1 | 8/2006 | Pettitt |
| 7,167,844 | B1 | 1/2007 | Leong et al. |
| 2001/0029496 | A1 | 10/2001 | Otto et al. |
| 2002/0078381 | A1 | 6/2002 | Farley et al. |
| 2003/0023543 | A1 | 1/2003 | Gunewardena et al. |
| 2003/0097292 | A1 | 5/2003 | Chen et al. |

FOREIGN PATENT DOCUMENTS

| | | |
|---|---|---|
| EP | 0 418 144 A1 | 3/1991 |
| EP | 1 081 665 A1 | 3/1991 |
| EP | 0418144 A1 | 3/1991 |
| EP | 1081665 A1 | 3/1991 |
| EP | 0598469 | 5/1994 |
| JP | H07-78165 A1 | 3/1995 |
| JP | H08-504284 A1 | 5/1996 |
| JP | H11-259571 A1 | 9/1999 |
| JP | H11-328318 A1 | 11/1999 |
| WO | WO 94/06103 A1 | 3/1994 |
| WO | 96/31043 A1 | 3/1996 |
| WO | WO 97/00483 A1 | 1/1997 |
| WO | WO 98/54667 A1 | 12/1998 |

OTHER PUBLICATIONS

Bodner, E. et al., "The Internet Billing Server: Design Document," Carnegie Mellon University Information Networking Institute, Master of Science Thesis, 1993.
Bodner, E., et al., "The Internet Billing Server: Analysis of Distributed computing and Cross Platform Issues," Carnegie Mellon University Information Networking Institute, Master of Science Thesis, 1993.
Bodner, E., et al., "The Internet Billing Server: Availability, Reliability & Scalability Issues in the MS4 Billing Server Design & Prototype," Carnegie Mellon University Information Networking Institute, Master of Science Thesis, 1993.
Rodriguez, K., "CyberSource Sells Software on Internet," InfoWorld, Nov. 21, 1994.
"CyberSource Begins to Offer Software of Symantic and Others on the Internet," The Wall Street Journal, Jan. 31, 1995.
"Software Sales Brought to the Internet," LAN Times, Jan. 9, 1995.
One-page flyer describing "softwarenet" service, Oct. 1995.
Fact Sheet describing "componentssoftware.net" service, 1995.
Hewlett-Packard Company, Product Brief. "software.net" service, Sep. 1995.
CyberSource Corporation, Press Release, Microsoft Corporation Chooses software.net to be First to Electronically Deliver Microsoft Software, Oct. 17, 1995.
Rigdon, J., "Microsoft to Sell Most Popular Software Through Resellers Using the Internet," The Wall Street Journal, Oct. 16, 1995.
CyberSource Corporation, Press Release, "Software.net Opens Internet Product Center to Connect Internet Publishes with Internet Customers," Oct. 23, 1995.
IBM Corporation, Press Release, "IBM and CyberSource Corporation Tap Into the Power of the Internet to Offer One-Stop Component Shopping," Nov. 13, 1995.
Kitchen, S., "Impule Items," Forbes, May 8, 1995.
Moeller, M., "New CyberSource of Information,"PC Week, Nov. 20, 1995.
Clancy, H., "Internet Makes Headway as Software Distribution Channel," Computer Reseller News, Nov. 20, 1995.
Marshall, M., et al., "Shopping for Software Object on the Web," Communications Week, Nov. 20, 1995.
Wilder, C., "Where to Buy Objects Over the Internet," Information Week, Dec. 11, 1995.
CyberSource Corporation, "CyberSource Corporate Backgrounder," 1996.
CyberSource Corporation, "News and Press Release Abstracts," Apr. 1996.
Press Release, "CyberSource's New Internet Commerce Service Provide Software Publishers Turn-Key Electronic Transaction and Distribution Services," Apr. 30, 1996.
CyberSource Corporation, Internet Commerce Services, "Schedule of Services for Distributors and Merchants," Sep. 6, 1996.
CyberSource Corporation, Merchant Internet Commerce Services, "Typical Commerce Site Functions and Integration Check List," 1996.
ICS Launch Schedule, prepared and printed in Dec. 1996.
ICS Customers list, prepared and printed in Dec. 1996.
MarketingWorks, CyberSource Capabilities Brochure Outline, Dec. 10, 1996.
CyberSource's ICS Launch PR Plan. Jan. 14, 1997.
CyberSource's Corporation Borchure, "CyberSource Internet Commerce Services," 1997.
CyberSource Corporation, "ICS CommerceFLEX Developer's Guide and Reference" Revision 2.03, Apr. 14, 1997.
Mott, Stephen. Resume, Processional Experience.
Levine, Leonard. Computer Privacy Digest V7#028. Computer Privacy digest. Oct. 1995, pp. 876-888.
Khare, Rohit. An example of net.credit.fraud risk in the field, FoRK Archive. Mar. 1996. pp. 1-2.
Anonymous. V/IP Phone/fax IP Gateway. Voice Interface Cards and PC Software. Nov. 1996, pp. 1-2.
Anonymous. IDT Releases Net2Phone commercial version Three Months Ahead of Schedule, Press Release, Aug. 1996. pp. 1-2.
Sears, Andrew. The Effect of Internet Telephony on the Long Distance Voice Market. Jan. 1995. pp. 895-918.
Soloman, Richard. "Anything you can do, I can do better, I can do anything better than you . . . " MIT Research Program on Communications Policy. pp. 919-927.
Sears, Andrew Innovations in Internet Telephony: The Internet as the Competitor to the POTS Network. Feb. 1996. pp. 928-939.
Savetz, Kevin, et al., Can I use the Internet as a Telephone? Version 0.5, Jul. 1996. <URL http://itel.mit.deu/itel/docs/MISC/voice_faq.html>.
Anonymous. Telia puts IP at core of strategy. Thompson Corporation Company. pp. 1, ISSN: 1042-6086. Oct. 1995.
Anonymous. Formulating and Communicating Rejection Under 35 U.S.C. 103 For Applications Directed To Computer-Implemented Business Method Inventions. Business Methods Patents—Formulating and Communicating 103 Rejections. pp. 962-978. Retrieved from the Internet: <URL: http://www.uspto.gov/web/menu/busmethp/busmeth103rej.htm>.
Anticipation Summary. Claim 3 of '154 Patent. pp. 979-991.
Appendix, Table 1, pp. 992-1036.
Claim 3 of '154 Patent. Tab II, Claim 3, pp. 1243-1266.
Claim 3 of '154 Patent Tab III, Claim 3. pp. 1267-1346.
Corrected Response, U.S. Appl. No. 08/901,687, dated Aug. 31, 1999, 6 pages.
Notice of Allowance, U.S. Appl. No. 08/901,687, dated Sep. 5, 1999, 5 pages.
Final Office Action, U.S. Appl. No. 08/901,687, mailed Jul. 6, 1999, 27 pages.

Response, U.S. Appl. No. 08/901,687, dated Apr. 21, 1999, 26 pages.

Cybersource, "Internet Commerce Services", services offering, printed Jan. 5, 2009, 2 pages.

McCrea, Philip, et al., "The Internet Report", Australian Taxation Office, CSIRO Division, Electronic Commerce Project, Jun. 1997, 184 pages.

Declaration of Stephen Mott, patent No. 6029,154, dated Apr. 28, 2005, 40 pages.

Berry, Michael, et al., Data Mining Techniques For Marketing, Sales, and Customer Support, John Wiley & Sons, Inc., Published by Wiley Computer Publishing. Jul. 2, 1997, pp. 1-5.

Shinohara, K., Notification of Grounds for Rejection, (in Japan Patent application 2002-539907), Published by Japan Patent Office. Mar. 13, 2007, pp. 1-4.

Alfuraih, S., et al. Using Trusted Email to Prevent Credit Card Frauds in Multimedia Products, World Wide Web and Web Information Systems, 5, 2002, pp. 245-256.

Allen, S., Credit Card Fraudsters? Swat Them!, On the Line [Mar./Apr. 1997], p. 32.

An e*guide to Cyberfraud, ClearCommerce Corporation, 1999. pp. 1-9.

ATACS Trademark: How ATACS Works, Bedford Associates, Inc. 1996.

Cunningham, L., Cutting Cell Fraud Frequency, Security Management. Oct. 1996, pp. 42-46, vol. 40, No. 10.

Cybersource, Advanced Fraud Screen Enhanced by VISA, Implementation Guide. Cybersource Corporation. Jul. 2004, 112 pages.

Cybersource, Fraud Control System. CyberSource Corporation, 1996. Retrieved from the Internet: <URL: http://web.archive.org/web/19970110062645/http./1/cybersource.com/products/fcs.html>.

Cybersource, Frequently Asked Questions. CyberSource Corporation, 1997. Retrieved from the Internet: <URL: http://web.archive.org/web/19971021082803/http://www.cybersource.com/faq/danger.htm>.

Cybersource, Merchant Internet Commerce Services, 1997. Retrieved from the Internet: <URL: http://web.archive.org/web/19971021082508/www.cybersource.com/service/ivs.htm>.

Fawcett, et al., Adpative Fraud Detection, Data Mining and Knowledge Discovery (to appear 1-28, 1997), Kluwer Academic Publishers, pp. 1-29.

Fawcett, et al., Adpative Fraud Detection, Data Mining and Knowledge Discovery. 1997, pp. 291-316.

Fawcett, at al., Combining Data Mining and Machine Learning for Effective User Profiling, Proceedings of the Second International Conference on Knowledge Discovery and Data Mining. KDD-96, AAAI Press 1996. pp. 8-13.

Gein, R., et al., The ABC's of Credit Card Processing, Perspectives, American Public Communications Council Inc., Dec. 1995, pp. 13-18.

Gifford, D., et al., Payment Switches for Open Networks, Proceedings of the 40th IEEE Computer Society International Conference, 1995, IEEE, pp. 26-31.

Lamm, Stephen E., et al., Real-Time Geographic Visualization of World Wide Web Traffic. Computer Networks and ISDN Systems 28, 1996, Elsevier Science B.V., pp. 1457-1468.

Newing, R., Data Mining, Management Accounting. Oct. 1996, pp. 34-36.

Scullin, W., et al., Real-Time Visualization of World Wide Web Traffic, 1995, pp. 1-13.

SNET Network Fraud Control System, SNET Interconnection Services Group, Jan. 1994. (2 pages).

Cybersource, "CyberSource Enhances Internet Fraud Screen to Combat Credit Card Fraud," Jun. 4, 2001, http://www.cybersource.com/press_room/view.xml?page_id=579, printed Apr. 23, 2002, 3 pages.

Cybersource, "CyberSource Introduces Credit Card Authorization Service Enhanced with a Powerful Fraud Screening Tool," Jan. 30, 2001, http://www.cybersource.com/press_room/view.xml?page_id=237, printed Apr. 23, 2002, 2 pages.

Techmall, "Meridien Launches New e*Payments Research Service identifying Web Opportunities and Risk for Retailers and Financial Firms," Dec. 1, 1999, http://www8/techmall.com/techdocs/TS991202-1.html, printed Apr. 23, 2002, 2 pages.

Datachash, "Payment Card Fraud Checking Service for E-Commerce," http://www.datacash.com/security/fraudscreening.html, printed Apr. 23, 2002, 2 pages.

Cybercash, "About CyberCash, Inc.," 2000, CyberCash Company Information, http://www.cybercash.com/company, 1 page.

Schoeter, A., et al., "Digital Money Online A Review of Some Existing Technologies," Feb. 1997, 60 pages, inter://trader.

Cybersource Corporation, "CyberSource IVS, Internet Fraud Screen with Artifical Intelligence," http://www.cybersource.com/html/solutions/fraud_main.html#overview, printed Dec. 16, 1998, 3 pages.

Webster's II. New Riverside University Dictionary, The Riverside Publishing Company, 1994, 4 pages.

Anonymous, "Faster Credit Card Authorization," Chain Store Age Executive with Shopper Center Age, New York, Mar. 1995, http://proquest.umi.com/pqdweb?TS=930258...1&Fmt=3&ldx=7&Dell=1&RQT=309&Dtp=1, printed Jun. 24, 1999, 4 pages.

Hanagandi, et al., Density-Based Clustering and Radial Basis Function Modeling to Generate Credit Card Fraud Scores, Feb. 6, 1996, Proceedings if the IEEE/IAFE 1996 Conference, pp. 247-251.

Slom, S., "Check Fraud: Verification Firms Help Cut $2.9 Billion Loss,"Stores, Feb. 1992, 1 page.

Richardson, "Neural Networks Compared to Statistical Techniques," Computational Intelligence for Financial Engineering (CIFEr), 1997; Proceedings of the IEEE/IAFE 1997, pp. 89-95, Mar. 1997 New York City, NY.

Ghosh, et al., "Credit Card Fraud Detection with a Neural-Network," System Sciences, 1994, vol. III: Information Systems: Decision Support and Knowledge-Based Systems, Proceedings of the Twenty-Seventh Hawaii International Conference, pp. 621-630, 4-7, Jan. 1994.

Mak, S., "Network Based Billing Server," Carnegie Mellon University, Information Networking Institute, Master of Science Thesis, 1991.

Cohen, D., "Computerized Commerce," ISI Reprint Series ISI/RS-89-243, Oct. 1989. Reprinted from Information Processing 89, Proceeding of the IFIP World Computer Congress, held Aug. 28-Sep. 1, 1989.

Cohen, D., "Electronic Commerce," University of Southern California, Information Sciences Institute, Research Report ISI/RR-89-244, Oct. 1989.

Jannson, L., "General Electronic Payment System." 7th Proceeding of the International Conference on Computer Communication, pp. 832-837, 1985.

Miller, S.P., et al., "Kerberos Authentication and Authorization Setup," Project Athena Technical Plan, Section E.2.1., Massachusetts Institute of Technology, Oct. 1988.

Davies, D.W., et al., "Security for Computer Networks: An Introduction to Data Security in Teleprocessing and Electronic Funds Transfer," John Wiley & Sons, Dec. 5, 1985.

Batelaan, Richard, et al., "An Internet Billing Server System Requirements," Carnegie Mellon University, Master of Science Thesis, 1992.

Batelaan, Richard, et al., "An Internet Billing Server Prototype Design," Carnegie Mellon University, 1992.

Bodner, E., et al., "The Internet Billing Server: Prototype Requirements," Carnegie Mellon University Information Networking Institute, Master of Science Thesis, 1993.

David K. Gifford, et al., "Payment Switches for Open Networks" IEEE Computer Society International Conference pp. 26-31.

Declaration of Donna Tucker, filed in In re Patent Application of: John P. Pettit, executed on Oct. 8, 2004 (2 pages).

Tom Clements, et al., "CyberSource's New Internet Commerce Services Provide Software Publishers Turn-Key Electronic Transaction and Distribution Services, Qualcomm, Insignia, Wall Data and seven other publishers choose CyberSource to distribute products via the Internet", Apr. 30, 1996, pp. 1-4, press release.

* cited by examiner

METHOD AND SYSTEM FOR DETECTING FRAUD IN A CREDIT CARD TRANSACTION OVER THE INTERNET

CROSS-REFERENCE TO RELATED APPLICATIONS

The present application claims the benefit and domestic priority under 35 U.S.C. §120 as a continuation of U.S. patent application Ser. No. 12/175,191, filed Jul. 17, 2008, now abandoned which is a continuation of prior U.S. patent application Ser. No. 11/168,966, filed Jun. 27, 2005, now abandoned which is a continuation of U.S. patent application Ser. No. 09/442,106, filed Nov. 17, 1999, now U.S. Pat. No. 7,096,192, which is a continuation of U.S. patent application Ser. No. 08/901,687, filed Jul. 28, 1997, now U.S. Pat. No. 6,029,154, the entire contents of which are hereby incorporated by reference for all purposes as set forth herein.

FIELD OF THE INVENTION

The present invention relates generally to credit card transactions and specifically to detecting fraud in such credit card transactions when ordering and downloading information over the Internet.

BACKGROUND OF THE INVENTION

Credit card transactions are being utilized in a variety of environments. In a typical environment a user provides a merchant with a credit card, and the merchant through various means will verify whether that information is accurate. For example, referring now to FIG. 1, a typical credit card verification system 10 is shown. In such a system, a merchant 12 receives a credit card from the customer 14. The merchant then verifies the credit card information through an automated verification system ("AVS") 16.

These systems work well in a credit card transaction in which either the customer has a face-to-face meeting with the merchant or the merchant is actually shipping a package or the like to the address of a customer. The verification procedure typically includes receiving at the AVS system address information and identity information. However, when downloading information from an online service or the Internet, the address and identity information are not enough to adequately verify that the customer who is purchasing the goods is actually the owner of the credit card. For example, an individual may have both the name and the address of a particular credit card holder and that information in a normal transaction may be sufficient for authorization of such a transaction. However, in an Internet transaction it is possible to obtain all the correct information related to the particular credit card holder through unscrupulous means, and therefore, be able to fraudulently obtain information.

Accordingly, what is needed is a system and method that overcomes the problems associated with a typical verification system for credit card transactions particularly in the Internet or online services environment. The system should be easily implemented within the existing environment and should also be straightforwardly applied to existing technology. The present invention addresses such a need.

DETAILED DESCRIPTION

The present invention relates to a fraud detection method, system and apparatus for use in credit card transaction over online services or the Internet. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
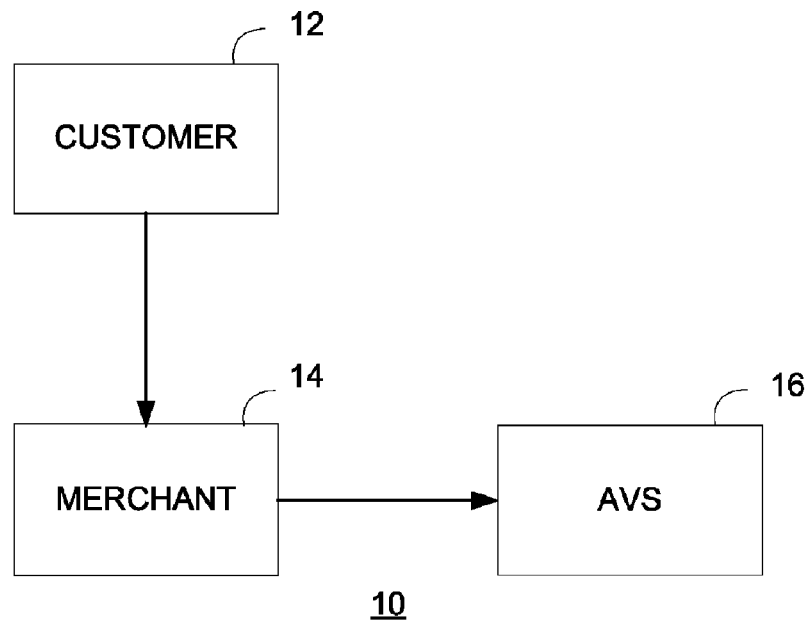
FIG. 1 is diagram of the prior art verification system for credit card transaction.
Figure 2:
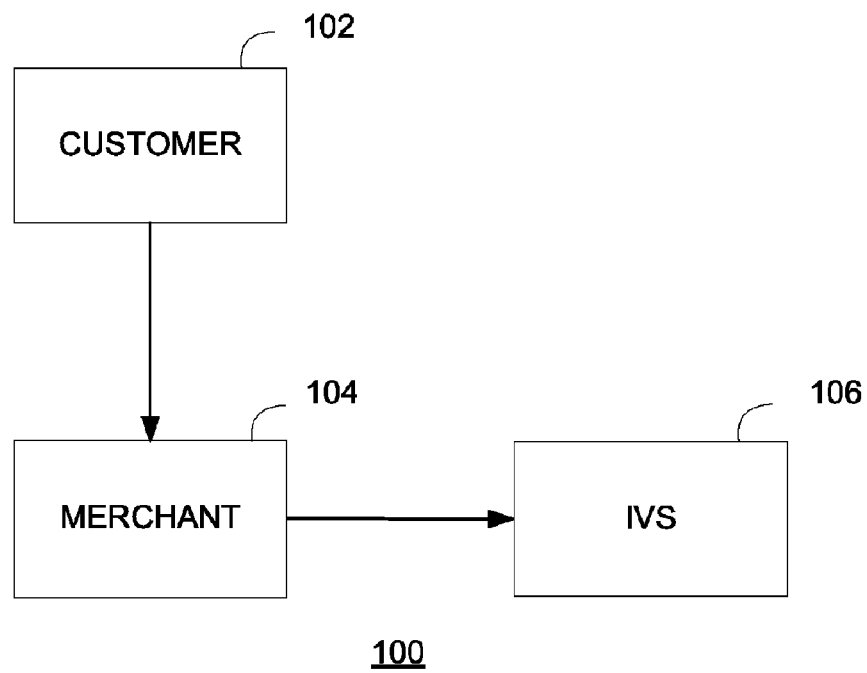
FIG. 2 is a verification system in accordance with the present invention.

The present invention provides an integrated verification system for credit card transactions over an online service or the Internet. Referring now to FIG. 2, what is shown is a block diagram of a system 100 which would use the verification procedure in accordance with the present invention. System 100 includes, similar to FIG. 1, a customer 102 and a merchant 104. The customer 102 provides the merchant with a credit card, and the merchant then sends information from it to an integrated verification system ("IVS") 106 which includes a variety of parameters providing consistency, history and other information in an integrated fashion to determine whether the credit card information is valid. The IVS 106 is typically implemented in software for example in a hard disk, floppy disk or other computer-readable medium. In a typical embodiment, when the customer 102 orders a particular piece of software to be downloaded from a merchant 104, the merchant will provide the credit card number, e-mail address and other pertinent information to the IVS 106. The integrated verification system 106 then weights the variety of parameters so as to provide a merchant with a quantifiable indication on whether the credit and transaction is fraudulent. To more clearly describe the operation of a system and method in accordance with the present invention, refer now to the following discussion in conjunction with the accompanying figures.

Figure 3:
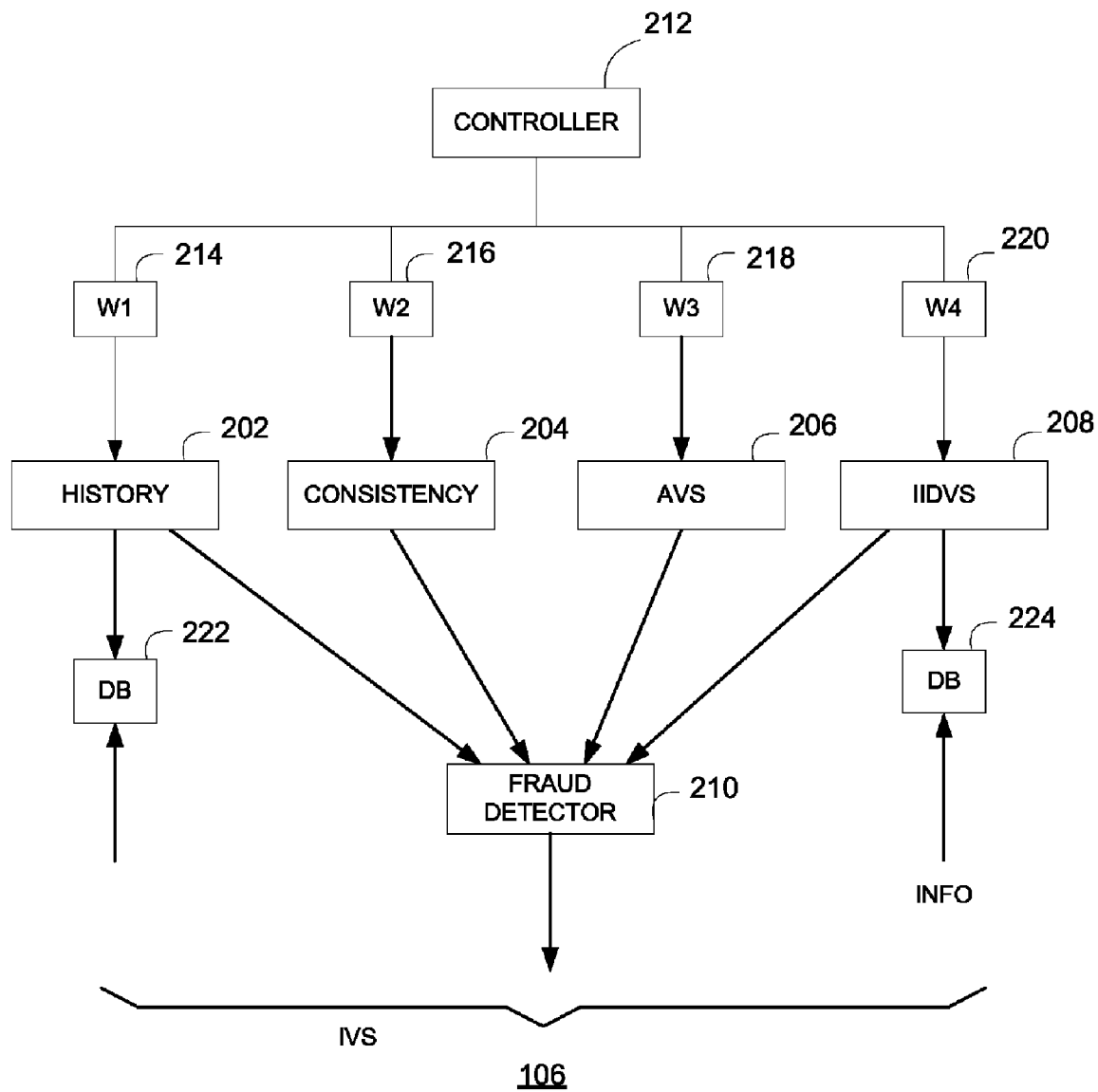
FIG. 3 is a flow chart of the verification system in accordance with the present invention.

FIG. 3 shows a simple block diagram for providing an integrated verification of a credit card transaction over the Internet. The IVS 106 includes a controller 212 which receives the credit information from the merchant and then sends that information on to a variety of parameters 202-208. The plurality of parameters operates on the information to provide an indication of whether the transaction is valid. In this embodiment, the plurality of parameters comprises a history check 202, a consistency check 204, an automatic verification system 206 and an Internet identification verification system ("IIVS") 208. The output or individual indications of validity of these parameters are provided to fraud detector 210. The fraud detector 210 combines these inputs to provide an integrated indication of whether the particular transaction is valid.

Consistency check 204 allows IVS 106 to determine whether the credit information is consistent, i.e., does the credit information match the user and other information. AVS system 206 provides similar information as AVS 16 described in FIG. 1. A key feature of both the history database 222 and the Internet ID database 224 is that they can be accessed and the information there within can be supplemented by a variety of other merchants and, therefore, information from those merchants is obtainable thereby.

History check 202 is provided which also accesses a history database 222 which may include card number and email information. The history check 202 will also actively determine if the particular transaction matches previous database information within the history database 222. Therefore, the Internet ID verification system 208 and history check 202 increases in utility over time. The Internet ID verification system 208 provides for a system for verifying the validity of an Internet address, the details of which will be discussed hereinafter. The Internet identification verification system 208 similar to the history check 202 includes a database 224, which can be added to by other merchants.

In addition, the Internet identification verification system 208 accesses and communicates with a database of Internet addresses. This system will be used to verify whether the Internet address is consistent with other Internet addresses being used in transactions utilizing this credit card.

These different parameters are weighted via weighting blocks 214-220, respectively, dependent upon the particular credit card transaction. For example, if the amount of dollar transaction is critical, it may be appropriate for the history check 202 and AVS system 206 to be weighted more critically than the other parameters. On the other hand, if a critical point is the consistency of the Internet address, then the consistency check 204 and the Internet identification system 208 may be more critical. Accordingly, each of the verification parameters 202-208 may be weighted in different amounts depending upon its importance in the verification process.

A particularly important feature of the present invention is the Internet identification system 208 and its operation within the integrated verification system 106. Through this system 208, it is possible to quickly determine if an Internet identification address is being utilized fraudulently. To describe this feature in more detail, refer now to FIG. 4 and the accompanying discussion.

Figure 4:
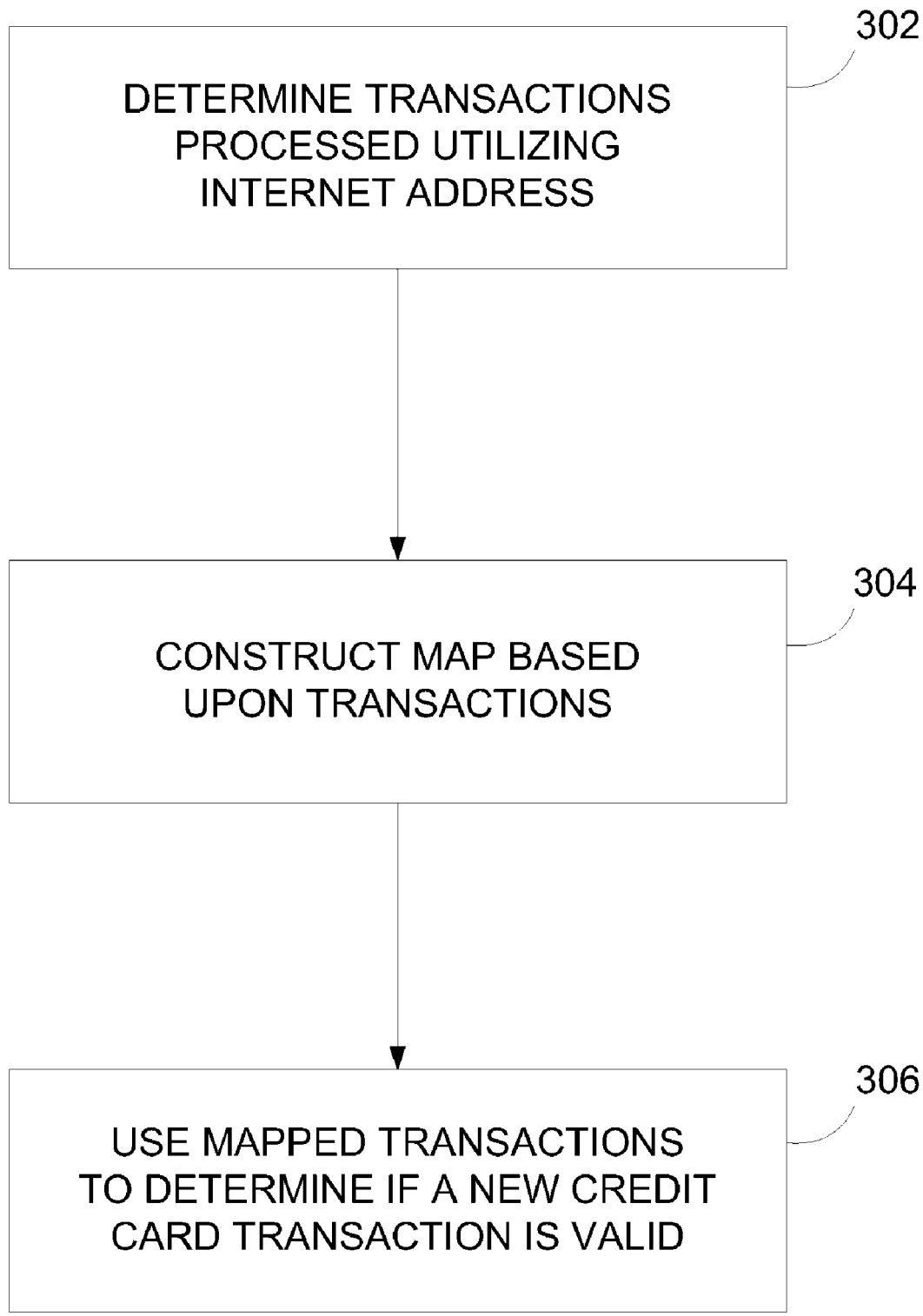
FIG. 4 is a flow chart of the integrated verification system in accordance with the present invention.

FIG. 4 is a flow chart of the Internet identification verification system 208. The goal of Internet identification verification system 208 is to determine whether the physical address or the physical location of the address compares to a previous physical location that was used for that particular Internet address. Accordingly, in the flow chart of FIG. 4, first the number of transactions that had been processed using that particular Internet address is obtained from the database 224, via step 302. Thereafter, a map of those transactions is constructed based on those obtained transactions, via step 304. Finally, the constructed map is used to determine if the new credit card transaction is valid, via step 306. Accordingly, through a system and method in accordance with this system, an Internet identification verification system is provided which can quickly and easily determine whether a particular Internet address is related to a particular credit card transaction.

Accordingly, what is provided is a system and method for accurately determining whether a particular credit card transaction is a fraudulent one. The integrated verification system in accordance with the present invention provides for weighting the variety of parameters so as to provide a merchant with a quantifiable indication on whether the credit and transaction is fraudulent.

Although the present invention has been described in accordance with the embodiments shown, one of ordinary skill in the art will recognize that there could be variations to the embodiment and those variations would be within the spirit and scope of the present invention. Therefore, although the present invention was described in terms of a particular verification system, one of ordinary skill in the art readily recognizes, that any number of parameters can be utilized and their use would be within the spirit and scope of the present invention. Accordingly, many modifications may be made by one of ordinary skill without departing from the spirit and scope of the present invention, the scope of which is defined by the following claims.

What is claimed is:

1. A computer-implemented method comprising:
    receiving by a computer, either directly or indirectly from a consumer through an online service or internet, a first information that is related to a current commercial transaction that is being evaluated for fraud, wherein the first information includes credit card information;
    obtaining by the computer an internet address from which the first information is received from the consumer;
    in response to obtaining the internet address the computer accessing at least one database to obtain a second information on a plurality of commercial transactions that have been previously associated with the internet address from which the first information is received from the consumer; and
    producing an indication on whether the current commercial transaction is fraudulent based on correlating at least one subset of the second information and at least one subset of the first information using at least computer instructions stored on a non-transitory computer readable medium.

2. The computer-implemented method of claim 1, wherein the second information accessed from the at least one database is aggregated from a plurality of merchants over time.

3. The computer-implemented method of claim 1, further comprising applying a plurality of parameters to the at least one subset of the first information for analyzing the at least one subset of the first information for fraud.

4. The computer-implemented method of claim 3, further comprising weighting the plurality of parameters based on relative importance of a respective parameter as determined by characteristics of the current commercial transaction that is being evaluated for fraud.

5. The computer-implemented method of claim 3, further comprising combining information from application of the plurality of parameters to the at least one subset of the first information for producing the indication on whether the current commercial transaction is fraudulent.

6. The computer-implemented method of claim 3, wherein the plurality of parameters includes at least an internet identification verification parameter for determining if the internet address from which the first information is received from the consumer is associated with fraud.

7. The computer-implemented method of claim 1, wherein the first information further includes at least: email address of the consumer, and shipping address.

8. The computer-implemented method of claim 1, further comprising determining whether the internet address is consistent with one or more internet addresses being used in commercial transactions utilizing the credit card information.

9. A computer system comprising:
    at least one database stored on a non-transitory computer readable medium of internet addresses and corresponding commercial transactions;
    at least one internet identification verification component at least part of which is stored on a non-transitory computer readable medium that is in communication with the at least one database of internet addresses and corresponding commercial transactions;

wherein the at least one internet identification verification component is configured to create a correlation between information on past commercial transactions and a respective internet address of a consumer associated with a current commercial transaction that is being evaluated for fraud;

at least a controller at least part of which is stored on a non-transitory computer readable medium and that is configured to receive through the internet from the consumer associated with the current commercial transaction, information related to the current commercial transaction including credit card information and the respective internet address of the consumer; and at least one fraud detection component at least part of which is stored on a non-transitory computer readable medium and that is configured to create an integrated indication of whether the current commercial transaction is fraudulent based on at least the correlation created by the at least one internet identification verification component.

10. The system of claim 9, further comprising a plurality of parameter components other than the at least one internet identification verification component for checking at least one subset of parameters from a plurality of parameters based on characteristics of the current commercial transaction.

11. The system of claim 10, wherein the plurality of parameters is weighted based on a predetermined set of criteria triggered by one or more characteristics of the current commercial transaction.

12. The system of claim 10, wherein the plurality of parameter components and the at least one internet identification verification component have access to information, aggregated from a plurality of merchants over time, on commercial transactions including corresponding internet address information of the consumer.

13. The system of claim 10, wherein the at least one fraud detection component receives input from at least a subset of the plurality of parameter components.

14. A system comprising:

at least one controller at least part of which is stored on a non-transitory computer readable medium and that is configured to receive, either directly or indirectly, from a consumer through an online service or internet, a first information that is related to a current commercial transaction that is being evaluated for fraud and an internet address from which the first information is received, wherein the first information includes credit card information;

at least one internet identification verification component at least part of which is stored on a non-transitory computer readable medium, wherein the at least one internet identification verification component is configured to create a correlation between the first information and a second information on a plurality of commercial transactions that have been previously associated with the internet address from which the first information is received wherein the second information is accessed from at least one database configured to store internet addresses and corresponding commercial transactions; and at least on fraud detection component at least part of which is stored on a non-transitory computer readable medium and configured to produce for producing an indication on whether the current commercial transaction is fraudulent based on at least the correlation between the first information and a second information on a plurality of commercial transactions that have been previously associated with the internet address from which the first information is received.

15. The system of claim 14, wherein the at least one database is configured to store at least the second information on a plurality of commercial transactions that have been previously associated with the internet address from which the first information is received.

16. The system of claim 14, further comprising a plurality of parameter components other than the at least one internet identification verification component for checking at least one subset of parameters from a plurality of parameters based on characteristics of the current commercial transaction, and wherein the plurality of parameter components and the at least one internet identification verification component have access to information, aggregated from a plurality of merchants over time, on commercial transactions including corresponding internet address information of the consumer.

17. The system of claim 16, wherein the plurality of parameters is weighted based on a predetermined set of criteria triggered by one or more characteristics of the current commercial transaction.

18. The system of claim 16, wherein the at least one fraud detection component receives input from at least a subset of the plurality of parameter components.

* * * * *